(12) United States Patent
Niedermeyer et al.

(10) Patent No.: US 10,267,364 B2
(45) Date of Patent: Apr. 23, 2019

(54) DEVICE FOR LUBRICATING AN ANTIFRICTION BEARING OF AN ELECTRIC MOTOR

(71) Applicant: SIEMENS AKTIENGESELLSCHAFT, München (DE)

(72) Inventors: Josef Niedermeyer, Hilpoltstein (DE); Ekkehard Ressel, Heilsbronn (DE)

(73) Assignee: Siemens Aktiengesellschaft, München (DE)

( * ) Notice: Subject to any disclaimer, the term of this patent is extended or adjusted under 35 U.S.C. 154(b) by 111 days.

(21) Appl. No.: 15/316,329

(22) PCT Filed: Jun. 1, 2015

(86) PCT No.: PCT/EP2015/062095
§ 371 (c)(1),
(2) Date: Dec. 5, 2016

(87) PCT Pub. No.: WO2015/185484
PCT Pub. Date: Dec. 10, 2015

(65) Prior Publication Data
US 2018/0187723 A1 Jul. 5, 2018

(30) Foreign Application Priority Data
Jun. 6, 2014 (EP) .................................... 14171573

(51) Int. Cl.
| F16C 33/66 | (2006.01) |
| F16C 35/04 | (2006.01) |
| F16C 19/06 | (2006.01) |

(52) U.S. Cl.
CPC .......... F16C 33/6666 (2013.01); F16C 19/06 (2013.01); F16C 35/042 (2013.01); *F16C 2380/26* (2013.01)

(58) Field of Classification Search
CPC . F16C 33/6666; F16C 35/042; F16C 2380/26
(Continued)

(56) References Cited

U.S. PATENT DOCUMENTS 2,000,581 A * 5/1935 Coffin, Jr. ........... F16C 33/6666
277/423
2,335,557 A * 11/1943 Winther .................... F16N 7/22
384/406

(Continued)

FOREIGN PATENT DOCUMENTS

| DE | 657 586 C1 | 3/1938 |
| DE | 10 93 387 B | 11/1960 |

(Continued)

*Primary Examiner* — James Pilkington
(74) *Attorney, Agent, or Firm* — Henry M. Feiereisen LLC

(57) ABSTRACT

A device for lubricating an antifriction bearing of an electric motor includes a lubrication chamber located around a shaft of the electric motor and adjacent to the antifriction bearing when the shaft rotates. The lubrication chamber has a radial outer wall which is provided with at least one opening. An oil reservoir configured for arrangement on an exterior or an interior of the electric motor includes an oil pan and a ring-shaped or disk-shaped oil delivery member which directly or indirectly moves along on the shaft and is configured to run through the oil pan and to enable oil to be transported from the oil pan into the lubrication chamber, with oil being able to flow out of the lubrication chamber via the at least one opening back into the oil pan.

11 Claims, 3 Drawing Sheets

(58) Field of Classification Search
USPC .......................................... 384/464, 465, 468
See application file for complete search history.

(56) References Cited

U.S. PATENT DOCUMENTS

| | | | | |
|---|---|---|---|---|
| 2,445,432 | A | * | 7/1948 | Hodell ................ F16C 33/6666 384/406 |
| 4,073,596 | A | * | 2/1978 | Erickson ............... F16C 33/664 415/112 |
| 6,008,557 | A | | 12/1999 | Dornhoefer |
| 8,408,806 | B2 | * | 4/2013 | Tecza .................. F16C 33/6666 384/405 |
| 2011/0280749 | A1 | | 11/2011 | Hahn |
| 2013/0272873 | A1 | | 10/2013 | Collins |

FOREIGN PATENT DOCUMENTS

| | | |
|---|---|---|
| DE | 1139705 B | 11/1962 |
| DE | 12 15 735 B | 5/1966 |
| DE | 19725970 A1 | 3/1998 |
| JP | 2006/345675 A | 12/2006 |
| JP | 2011/239584 A | 11/2011 |
| SU | 147646 A1 | 11/1961 |
| SU | 1733751 A1 | 5/1992 |

\* cited by examiner

DEVICE FOR LUBRICATING AN ANTIFRICTION BEARING OF AN ELECTRIC MOTOR

CROSS-REFERENCES TO RELATED APPLICATIONS

This application is the U.S. National Stage of International Application No. PCT/EP2015/062095, filed Jun. 1, 2015, which designated the United States and has been published as International Publication No. WO 2015/185484 A1 which claims the priority of European Patent Application, Serial No. 14171573.0, filed Jun. 6, 2014, pursuant to 35 U.S.C. 119(a)-(d).

BACKGROUND OF THE INVENTION

The invention relates to a device for lubricating an antifriction bearing of an electric motor.

The shafts of electric motors, in particular electric motors of a large design, can either be mounted by means of slide bearings or by means of antifriction bearings. Here adequate lubrication must be ensured in each case.

For financial reasons slide bearings are used rarely and only if it is technically required.

With large electric motors, antifriction bearings are operated in most cases using grease lubrication. Here a re-lubrication is in most cases required after a certain number of operating hours (for instance 1000 operating hours).

SUMMARY OF THE INVENTION

The object underlying the invention is to specify an improved device for lubricating an antifriction bearing of an electric motor.

The object is achieved in accordance with the invention by a device for lubricating an antifriction bearing of an electric motor, with the device including an oil reservoir which can be arranged on an exterior or interior of the electric motor having an oil pan and an oil delivery ring or oil delivery disk which directly or indirectly moves along on a shaft of the electric motor and runs through the oil pan, and allows oil to be transported from the oil pan into a lubrication chamber located around the shaft and adjacent to the antifriction bearing when the shaft rotates.

Advantageous embodiments of the invention form the subject matter of the subclaims.

An inventive device for lubricating an antifriction bearing of an electric motor comprises an oil reservoir which can be arranged on an electric motor and includes an oil pan and an oil delivery ring which directly or indirectly moves along a shaft of the electric motor and runs through the oil pan and allows oil to be transported from the oil pan into a lubrication chamber located around the shaft and adjacent to the antifriction bearing when the shaft rotates.

A reliable and self-supporting permanent lubrication is made available by the inventive device. Compared with a grease-lubricated antifriction bearing of an electric motor, the inventive device dispenses with the regular effort of re-lubrication. Costs are saved in this way. Moreover, the antifriction bearing can be cooled by the oil and the service life of the antifriction bearing can be extended.

The oil reservoir can be arranged on an exterior or an interior of the electric motor. An oil delivery disk can also be provided instead of the oil delivery ring.

In one embodiment of the invention, a bush, upon which the oil delivery ring runs, can be arranged on the shaft. The bush can be formed from a material, by means of which the oil delivery ring is subjected to less wear than directly on the shaft. Moreover, in accordance with the requirements to guide the oil delivery ring, the bush can be easily provided on its exterior with a contour, without negatively affecting the stability of the shaft of the electric motor. For instance, the bush can be heat shrunk onto the shaft.

In one embodiment of the invention, the oil delivery ring has an internal diameter, which is considerably larger than an external diameter of the shaft and/or the bush. In this way the oil pan can be distanced relatively far away from the shaft.

In one embodiment of the invention, the bush or the shaft has an outer surface, the diameter of which tapers axially away from the antifriction bearing. In this way the oil delivery ring is guided away from the antifriction bearing during rotation of the shaft so that it does not come into contact therewith and damages are thus avoided.

In one embodiment of the invention, the bush or the shaft has an outer surface, in which a peripheral shoulder or groove is provided, the diameter of which is reduced in stages compared with an adjoining region of the outer surface, in order to keep the oil delivery ring within the shoulder at a determined axial position on the bush or the shaft. In particular in conjunction with the tapering outer surface of the bush or shaft, a precise axial position of the oil delivery ring can thus be achieved and retained.

In one embodiment of the invention, one or a number of shaft sealing rings are provided to seal the shaft in the axial direction behind the antifriction bearing toward the electric motor and/or from the lubrication chamber toward an environment, in order to avoid lubrication losses and contamination of the inside of the electric motor and its environment with oil.

In one embodiment of the invention, an outer centrifugal disk is arranged on the shaft adjacent to the lubrication chamber in the axial direction away from the electric motor. In addition or alternatively, an inner centrifugal disk is arranged on the shaft adjacent to the antifriction bearing in the axial direction toward the electric motor. In this way the shaft sealing rings can be protected from excessively high oil quantities.

In one embodiment of the invention, the outer centrifugal disk and/or the inner centrifugal disk each have a peripheral groove on a side facing the lubrication chamber, the cross-section of which in the direction of a radial exterior of the respective centrifugal disk has a smaller radius than in the direction of a radial interior of the respective centrifugal disk.

In one embodiment of the invention, a return channel is provided to return oil from a region behind the antifriction bearing in the direction toward the electric motor into the oil pan, so that a circulation is produced and potential wear debris is removed from the antifriction bearing and collects on the base of the oil pan where it can be removed when oil is replaced for instance.

In one embodiment of the invention, two shaft sealing rings are arranged one behind the other behind the antifriction bearing in the direction of the electric motor, wherein a pressure equalization channel is provided between the two shaft sealing rings, which is connected to an environment of the electric motor. Potential overpressures or low pressures are reduced in this way.

In one embodiment of the invention, the oil delivery ring has an approximately trapeze-shaped cross-section, wherein the longer of the two parallel sides of the trapeze points inwards.

In one embodiment of the invention, an oil inlet opening is provided in the oil reservoir and an oil outlet opening which can be closed with an oil outlet screw is provided on a base of the oil pan.

In one embodiment of the invention, an oil runout is provided in the oil reservoir, so that the oil reservoir can be embedded in an oil circuit by way of the oil inlet opening and the oil runout.

In a further embodiment of the invention, a window is arranged in the oil reservoir, in order to be able to monitor the oil level and the color of the oil.

The shaft sealing ring or the shaft sealing rings can each be embodied as a touching or contactless seal.

BRIEF DESCRIPTION OF THE DRAWING

The above-described properties, features and advantages of this invention and the manner in which these are achieved will now be described more clearly and intelligibly in relation to the following description of exemplary embodiments, which are explained in detail by reference to the drawings, in which.

Parts which correspond to one another are provided with the same reference signs in all the figures.

DETAILED DESCRIPTION OF THE EMBODIMENTS

Figure 1:
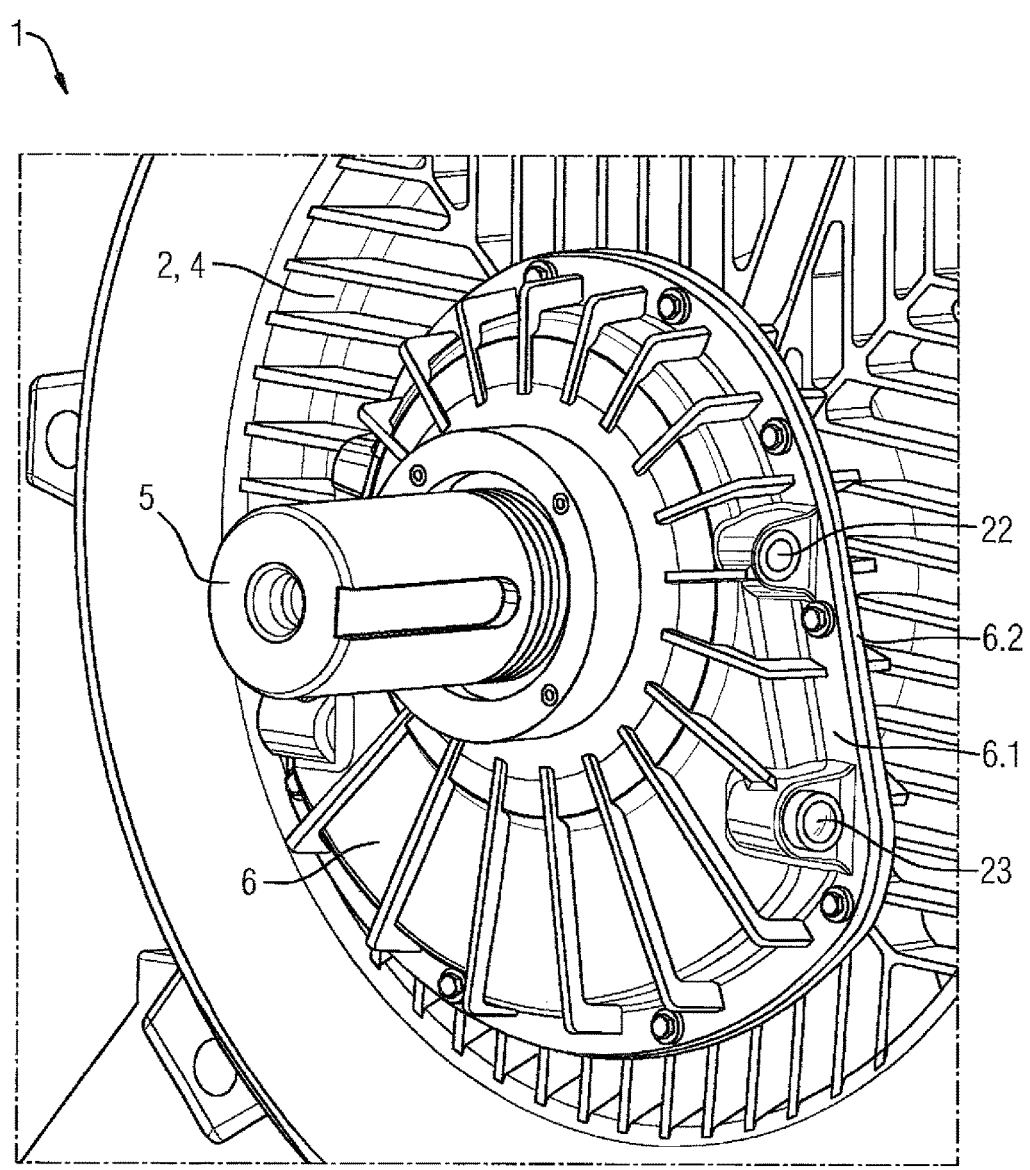
FIG. 1 shows a schematic perspective view of a device for lubricating an antifriction bearing on an electric motor.
Figure 2:
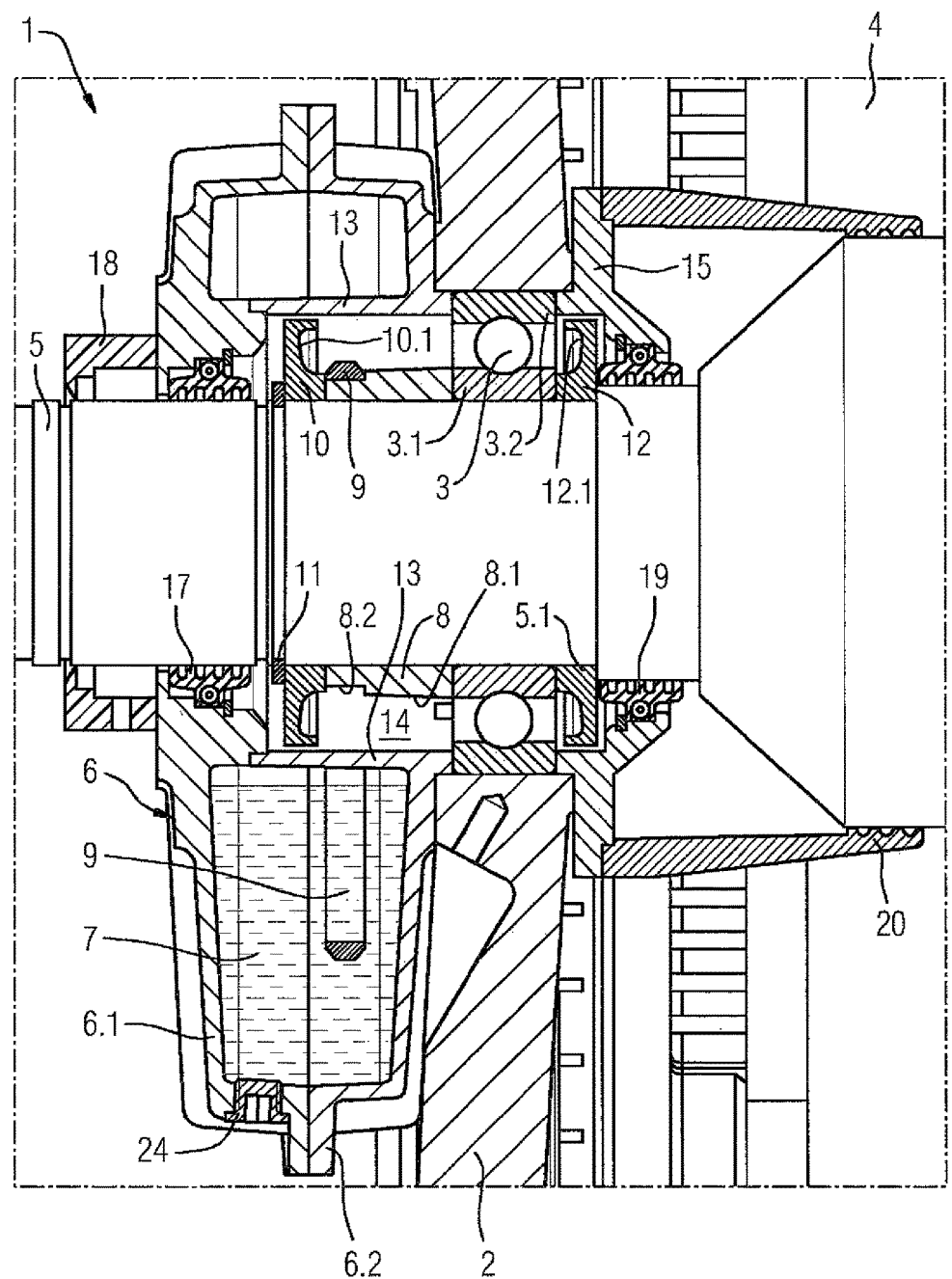
FIG. 2 shows a schematic longitudinal section of the device for lubricating the antifriction bearing.

FIG. 1 shows a schematic perspective view of a device 1 for lubricating an antifriction bearing (not shown in FIG. 1) in a bearing shield 2 of an electric motor 4. FIG. 2 shows a schematic longitudinal section of the device 1 for lubricating the antifriction bearing 3 in the bearing shield 2 of the electric motor 4. The antifriction bearing 3 supports a shaft 5 of the electric motor 4 and is arranged in the bearing shield 2.

The device 1 comprises an oil reservoir 6, which can be formed from two housing parts 6.1, 6.2 which are connected, for instance screwed or interlocked, to one another.

An oil pan 7 which, in a position of use shown in FIG. 2, is disposed below the device 1 is provided in the oil reservoir 6. The oil pan 7 is filled at least partially with a lubricant, for instance an oil.

A bush 8 is arranged on the shaft 5 of the electric motor 4 which runs through the oil reservoir 6. An oil delivery ring 9 is arranged so as to move loosely along the bush 8, the internal diameter of which is considerably larger than an external diameter of the bush 8, such that in the position of use the oil delivery ring 9 rests from above onto the bush 8 and, in the position of use, runs downwards through the oil pan 7. The oil delivery ring 9 is thus made to rotate frictionally when the shaft 5 rotates, and in this way conveys oil from the oil pan 7 to the bush 8 and/or by spinning the oil from the oil delivery ring 9 and/or from the bush 8 to a radial outer wall 13 of a lubrication chamber 14 externally adjoining the bush 8.

The bush 8 has an outer surface 8.1, the diameter of which tapers radially away from the antifriction bearing 3. In addition, the outer surface 8.1 of the bush 8 has a peripheral shoulder 8.2 or groove, the diameter of which, compared with the adjoining region of the outer surface 8.1, is reduced in stages, so that within the shoulder 8.2 the oil delivery ring 9 is held at a certain axial position on the bush 8. In the event that the oil delivery ring 9 is not disposed in the shoulder 8.2, the outer surface 8.1 of the bush 8 which tapers in the direction of the shoulder 8.2 ensures that the oil delivery ring 9 is guided into the shoulder 8.2 when the shaft 5 rotates.

The bush 8 adjoins an inner ring 3.1 of the antifriction bearing 3 in the axial direction toward the antifriction bearing 3. In the axial direction away from the antifriction bearing 3, the bush 8 adjoins an outer centrifugal disk 10 arranged on the shaft 5, it being possible to hold said centrifugal disk 10 in the axial position on the shaft 5 by means of a securing ring 11 and to extend the same radially approximately up to the radial outer wall 13 of the lubrication chamber 14, but, however, to distance the same contactlessly from the radial outer wall 13.

A further inner centrifugal disk 12 is arranged behind the inner ring 3.1 of the antifriction bearing 3 in the axial direction toward the electric motor 4 and is held in the axial direction by a flange 5.1 of the shaft 5, the diameter of which is larger than the part of the shaft 5 upon which the inner centrifugal disk 12 rests. The inner centrifugal disk 12 extends radially approximately up to an inner bearing seat 15 retaining an outer ring 3.2 of the antifriction bearing 3 in the axial direction toward the electric motor 4, it is however distanced contactlessly from the inner bearing seat 15.

An outer bearing seat for axially fixing the outer ring 3.2 in the direction away from the electric motor 4 can be formed by the radial outer wall 13.

The centrifugal disks 10, 12 each have a peripheral groove 10.1, 12.1 on their sides which face one another in each case, the cross-section of which has a smaller radius in the direction of a radial exterior of the centrifugal disk 10, 12 than in the direction of a radial interior of the centrifugal disk 10, 12. The oil centrifuged on the radial outer wall 13 and adhering to the bush 8 extends from there into the antifriction bearing 3.

One or a number of shaft sealing rings 17, 18 is/are provided on the shaft 5 inside and outside of the oil reservoir 6 in the axial direction pointing away from the electric motor 4, in order to prevent oil potentially extending behind the outer centrifugal disk 10 from escaping. A shaft sealing ring 19 is likewise provided on the shaft 5 behind the inner centrifugal disk 12 in the axial direction toward the electric motor 4.

Figure 3:
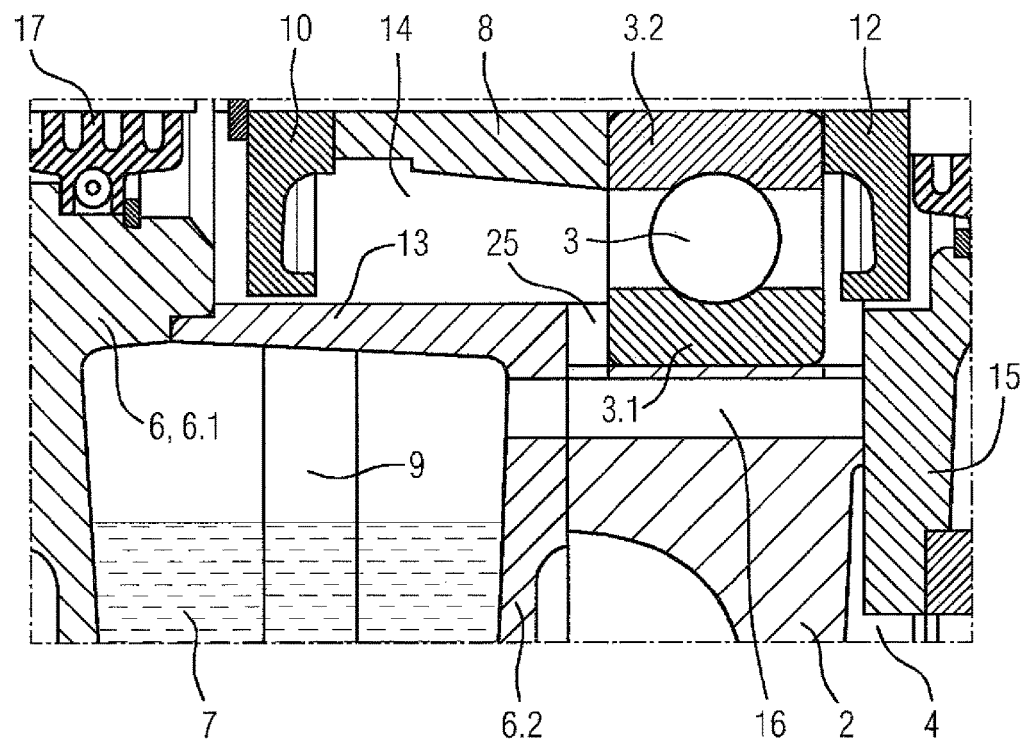
FIG. 3 shows a schematic detailed section of the device for lubricating the antifriction bearing.
Figure 4:
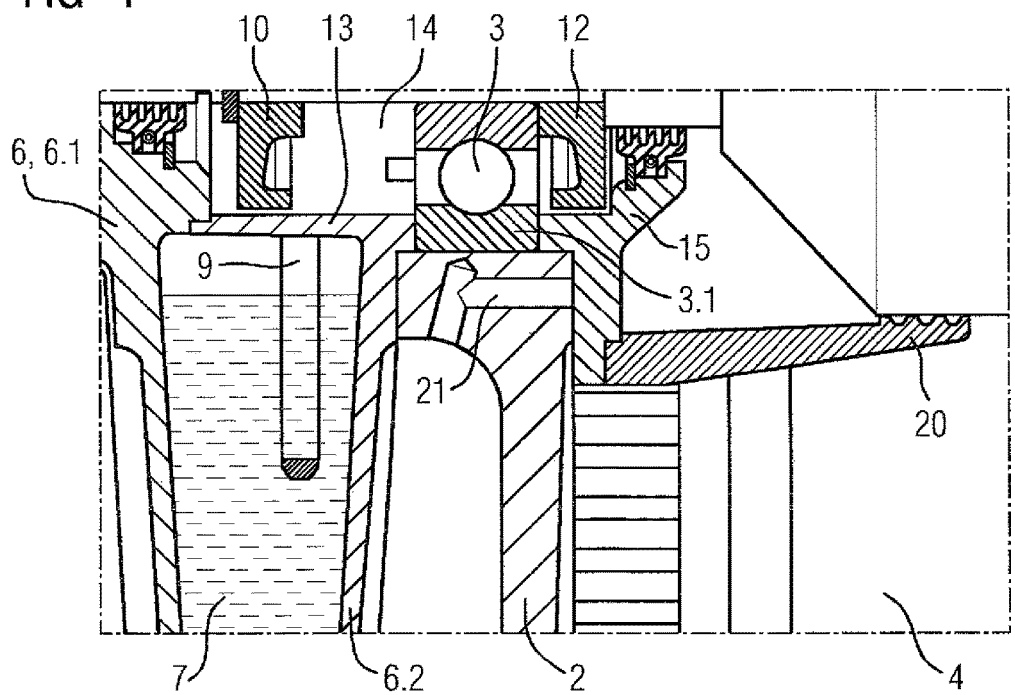
FIG. 4 shows a further schematic detailed section of the device for lubricating the antifriction bearing.

FIGS. 3 and 4 each show different schematic detailed sections of the device 1 for lubricating the antifriction bearing 3.

From the region behind the antifriction bearing 3 in the direction of the electric motor 4, the oil can flow back through a gap between the inner centrifugal disk 12 and the outer ring 3.2 of the bearing and through a return channel 16 provided in the bearing shield 2 into the oil pan 7, so that a circulation occurs and potential wear debris is removed from the antifriction bearing 3 and collects on the base of the oil pan 7, where it can be removed for instance when the oil is changed.

One or a number of openings 25 can be provided in the outer wall 13, through which oil can flow back out of the lubrication chamber 14 into the oil pan 7. The opening 25 is dimensioned such that an oil level in the lubrication chamber 14 upstream of the antifriction bearing 3 and thus a quantity of oil supplied to the antifriction bearing 3 can be measured precisely.

Furthermore, a further shaft sealing ring 20 for reducing potential overpressures or low pressures can be provided in the direction of the electric motor 4. To this end, a pressure equalization channel 21 is provided between the two shaft sealing rings 19 and 20, which is connected to an environment of the electric motor 4.

The oil reservoir 6 can also have an oil inlet opening 22, through which the oil can be filled. Furthermore, a window 23 can be provided to inspect the oil level. Instead of the window 23, an oil runout can also be provided so that the oil reservoir 6 can be embedded in an oil circuit by way of the oil inlet opening and the oil runout. Moreover, an oil outlet screw 24 can be provided on the base of the oil pan 7.

The shaft sealing rings 17, 18, 19, 20 can be embodied as a touching or contactless seal.

In the exemplary embodiment shown, the oil delivery ring 9 has an approximately trapeze-shaped cross-section, wherein the longer of the two parallel sides of the trapeze points inwards. In alternative exemplary embodiments, other cross-sectional forms of the oil delivery ring 9 are possible.

In an alternative exemplary embodiment, the oil delivery ring 9 can also be arranged to run directly on the shaft 5, so that it is possible to dispense with the bush 8.

The centrifugal disks 10, 12 protect the shaft sealing rings 17, 18, 19, 20 from excessively large oil quantities. In an alternative exemplary embodiment, the device 1 can however also be embodied without the centrifugal disks 10, 12.

Although the invention has been illustrated and described in detail by preferred exemplary embodiments, the invention is not restricted by the disclosed examples and other variations can be derived herefrom by the person skilled in the art without departing from the scope of protection of the invention.

The invention claimed is:

1. A device for lubricating an antifriction bearing of an electric motor, comprising:
   a lubrication chamber located around a shaft of the electric motor and adjacent to the antifriction bearing when the shaft rotates, said lubrication chamber having a radial outer wall provided with at least one opening;
   an oil reservoir configured for arrangement on an exterior or an interior of the electric motor, said oil reservoir comprising an oil pan and a ring-shaped or disk-shaped oil delivery member which moves along on the shaft and is configured to run through the oil pan and to enable oil to be transported from the oil pan into the lubrication chamber, with oil being able to flow out of the lubrication chamber via the at least one opening back into the oil pan; and
   at least one member selected from the group consisting of an outer centrifugal disk arranged on the shaft adjacent to the lubrication chamber in an axial direction away from the electric motor and an inner centrifugal disk arranged on the shaft in an axial direction toward the electric motor,
   wherein the member has a peripheral groove provided on a side facing the lubrication chamber and having a radial exterior with a cross section defined by a first radius and a radial interior with a cross section defined by a second radius, with the first radius being smaller than the second radius.

2. The device of claim 1, further comprising a bush arranged on the shaft, said oil delivery member running on the bush.

3. The device of claim 2, wherein the oil delivery member has an internal diameter which is greater than an external diameter of the bush.

4. The device of claim 1, wherein the oil delivery member has an internal diameter which is greater than an external diameter of the shaft.

5. The device of claim 1, further comprising at least one shaft sealing ring configured to seal the shaft in an axial direction behind the anti-friction bearing toward the electric motor and/or away from the lubrication chamber in relation to an environment.

6. The device of claim 5, wherein the shaft sealing ring is configured as a touching or contactless seal.

7. The device of claim 1, further comprising a return channel for returning oil from a region behind the antifriction bearing into the oil pan.

8. The device of claim 1, wherein the oil delivery member has a substantially trapeze-shaped cross-section defined by two parallel sides, with a longer one of the two parallel sides pointing inwards.

9. The device of claim 1, wherein the oil reservoir has an oil inlet opening and an oil outlet opening on a base of the oil pan, and further comprising an oil outlet screw adapted to close the outlet opening.

10. The device of claim 1, wherein the oil reservoir includes a window for inspection.

11. A device for lubricating an antifriction bearing of an electric motor, comprising:
    a lubrication chamber located around a shaft of the electric motor and adjacent to the antifriction bearing when the shaft rotates, said lubrication chamber having a radial outer wall provided with at least one opening;
    an oil reservoir configured for arrangement on an exterior or an interior of the electric motor, said oil reservoir comprising an oil pan and a ring-shaped or disk-shaped oil delivery member which moves along on the shaft and is configured to run through the oil pan and to enable oil to be transported from the oil pan into the lubrication chamber, with oil being able to flow out of the lubrication chamber via the at least one opening back into the oil pan; and
    two shaft sealing rings arranged in succession behind the anti-friction bearing in a direction toward the electric motor, with a pressure-equalization channel being provided between the two shaft sealing rings and connected to an environment of the electric motor.

\* \* \* \* \*